UNITED STATES PATENT OFFICE.

WILLIAM AUGUSTUS BATTERSBY, OF WILLIAMSBURG, N. Y., ASSIGNOR TO HIMSELF, TIMOTHY R. CRAWFORD, ROBERT BROWN, AND JOHN ANDERSON.

IMPROVEMENT IN COMPOUND FOR PIPES, TILES, SIDEWALKS, &c.

Specification forming part of Letters Patent No. 108,957, dated November 8, 1870.

*To all whom it may concern:*

Be it known that I, WILLIAM AUGUSTUS BATTERSBY, of Williamsburg, in the county of Kings and State of New York, have invented a new and Improved Silicious Compound; and I do hereby declare that the following is a full, clear, and exact description thereof, which will enable others skilled in the art to make and use the same.

This invention relates to a new composition for casting or molding pipes, tiles, and other mineral articles, as well as for sidewalks, streets, flooring, and similar purposes, and has for its object to so fuse together and combine the inexpensive and abundant silicious matter that the same can be advantageously utilized for the above purposes.

My composition consists of the following ingredients, composed in about the proportions set forth, to wit: seven hundred and sixteen parts of silicious matter, twenty-five parts of manganese, seventy-five parts of oxide of iron, sixty parts of kaolin, sixty parts of sulphate of lime, one part of sulphur, two parts of silicate of soda, sixty parts of resin, one part of petroleum—one thousand parts total, by weight.

The composition is prepared in substantially the following manner, to wit: The resin and petroleum are first mixed in a vessel and heated to about 400° Fahrenheit; the silicate of soda is then added to and dissolved by the same; the kaolin and gypsum are next added. The temperature of the mixture is now raised to about 500°. The manganese, oxide of iron, and sulphur are next added. The silicate is, in a separate vessel, heated to a red heat, and in such state added to the above compound, which is then stirred until all parts have become duly amalgamated. The mixture can now be cast, molded, or applied in the desired manner.

It will be seen that the silicious material, by being brought to a red heat, is in a state to dissolve the silicate of soda, manganese, and sulphur, or rather to cause the same to intimately combine with the silicious particles, and on cooling to firmly bind the same together. The pores usually formed in silicious compounds will thereby be closed, and the same become actually impervious to water, and almost entirely neutral to atmospheric influences. The kaolin and gypsum also combine to form an adhesive substance for closing the pores. The silicate of soda also serves to vitrify the composition throughout, and on the surface to give it a finished appearance. It may be used in a crystallized or dissolved state, preferably in the former. The sulphur, in uniting with the resin or the vegetable equivalent of the same, prevents it from resuming its original brittleness, and makes it actually pliable in the compound. The petroleum, in place of which any other hydrocarbon liquid or residuum may be employed, serves only to dissolve the resin.

It is evident that the proportions above stated may be varied in accordance with the nature of the compound to be obtained. Nevertheless the proportions stated appear most desirable, as with a greater proportion of silicious matter greater heat for fusing is required, while the expense is also increased on account of the additional chemicals required whenever the proportionate quantity of silicate is reduced.

Having thus described my invention, I claim as new and desire to secure by Letters Patent—

The silicious compound herein described, prepared substantially as specified.

WILLIAM AUGUSTUS BATTERSBY.

Witnesses:
  A. V. BRIESEN,
  GEO. W. MABEE.